Patented Oct. 30, 1934

1,979,016

UNITED STATES PATENT OFFICE 1,979,016

STERILE MODELING CLAY

Lee W. Sexton, Easton, Pa., assignor to Binney & Smith Company, a corporation of New Jersey No Drawing. Application July 3, 1933, Serial No. 679,002

6 Claims. (Cl. 106—36)

This invention relates to plastic compositions which retain their plasticity over long periods of time, due to their non-drying characteristics, particularly to so-called modeling clays.

One object of the present invention is the production of a more hygienic modeling clay by incorporating into the same powerful yet harmless, antiseptics.

Modeling clay is used to a large extent in schools for training children in the manual arts. This clay generally passes from one class to the next, and by transmitting microorganisms, such as bacteria or other fungi, may become a dangerous source of diseases, especially in view of the susceptibility of children to infection. To overcome this objection, my present invention contemplates the incorporation into modeling clay of sufficient amounts of powerful antiseptics which will immediately sterilize microorganisms contacting the same, while being harmless to the human body externally as well as internally.

Another object of my present invention is a method of finely dispersing the antiseptic, which is non-volatile at ordinary room temperatures, in the modeling clay composition.

Modeling clays are commonly manufactured by intimately mixing clays or other earthy materials with proper amounts of glycerine and molten petrolatum, the latter serving to impart plasticity, "feel", and non-drying characteristics to the composition. Other ingredients, such as fillers, pigments, emulsifying agents, talc, etc., may be admixed thereto to modify its characteristics. I have found by experimentation that Florida clay, a "plastic clay" of the Oligocene, in combination with suitable amounts of lithopone, glycerine, antiseptics and molten petrolatum, produces an excellent modeling clay which will not unduly adhere to the hands and tools of the worker, although my antiseptics may be admixed with any other known modeling clay mixture.

I am well aware that U. S. Patents 1,568,098 of January 5, 1926 and Re. 16,435 of October 5, 1926 to Snook disclose the admixture of small quantities of methyl salicylate with modeling clay containing glue. Methyl salicylate, although having somewhat antiseptic properties, is a volatile liquid, and it evaporates from the plastic composition on standing at room temperatures. Snook, adds the methyl salicylate to his clay composition to preserve the glue while the mixture is still in a moist condition. His composition hardens after application, the methyl salicylate evaporates and, thus the clay mixture fails to retain antiseptic properties which are necessary to keep it permanently in sterile condition.

According to my invention only such antiseptics are incorporated into plastic compositions as are solid and non-volatile at ordinary temperatures, while being harmless to the human body externally as well as internally.

I have discovered that monohydric phenols, such as thymol, carvacrol, chlorthymol and the like, are especially suitable for the purpose aforementioned. Chlorthymol, $C_{10}H_{13}OCl$, a crystalline compound with melting point of 58–60° C. and a phenol coefficient of about 120 is particularly adapted for incorporation into plastic compositions of the non-drying type. Such chlorthymol or 6 - chloro - 3-oxy-methyl-4-isopropylbenzene may be prepared, for example, by reacting 1 molecule of sulfuryl chloride upon 1 molecule of thymol (Beilstein, "Handbuch der Organischen Chemie", Vol. VI, 1923, page 539). Although thymol is a very active antiseptic, it is nevertheless non-irritating to the skin and non-poisonous when accidently swallowed in small quantities by children. Due to the fact that it is non-volatile at ordinary temperatures, it remains in the plastic composition and retains its germicidal properties over relatively long periods of time.

In order to secure an effective germicidal action throughout the modeling clay composition, it is necessary to finely divide or disperse the antiseptic in the other ingredients. Chlorthymol, for example, may be first dissolved in a volatile solvent which might also have antiseptic properties, such as methyl salicylate. One part of chlorthymol is dissolved in about two parts of methyl salicylate and the solution added to a suitable amount of molten petrolatum. The chlorthymol-methyl salicylate-petrolatum mixture is then intimately dispersed in the clay composition. I have found that 70 grains of chlorthymol for every 100 pounds of manufactured modeling clay are sufficient to render the same sterile and to preserve its hygienic condition for long periods of time. The finished product may be packed in air-tight containers for shipment and storage to prevent possible oxidation of its ingredients.

While I have found that chlorthymol is especially effective in preserving the sterility of modeling clay throughout its life, other antiseptics, which are chemically inert with respect to the other ingredients of such plastic compositions and are harmless to the human body, may be used for the purpose afore-mentioned. By the term "antiseptic" as used throughout this specification and claims is meant any chemical element or substance capable of destroying pathogenic organisms not infrequently carried on the hands of humans, as distinguished from chemicals, such as free sulphur, which while perhaps having value as an insecticide or fungicide possess little or no disinfecting or germicidal properties. The present invention is not limited to the specific details of manufacture set forth in the foregoing example, which should be construed as illustrative and not by way of limitation. In view of the numerous modifications which may be effected therein without departing from the spirit and the scope of this invention, only such limitations should be imputed as are indicated in the appended claims.

I claim:

1. A sterile modeling clay remaining plastic for long periods of time having incorporated therein a solid monohydric phenol, said phenol being present in such amount as to be harmless to the human body externally as well as internally and being non-volatile at ordinary room temperatures.

2. A sterile modeling clay remaining plastic for long periods of time having chlorthymol incorporated therein.

3. A sterile plastic material comprising 100 pounds of a modeling clay composition and 70 grains of chlorthymol.

4. The method of finely dispersing chlorthymol in plastic material comprising dissolving chlorthymol in methyl salicylate, adding said dissolved chlorthymol to molten petrolatum and subsequently mixing said chlorthymol-methyl salicylate-petrolatum composition with said plastic material.

5. The method of finely dispersing chlorthymol in modeling clay comprising dissolving said chlorthymol in methyl salicylate, adding said dissolved chlorthymol to molten petrolatum, and subsequently mixing said chlorthymol-methyl salicylate-petrolatum composition with said modeling clay.

6. A sterile modeling composition remaining plastic for long periods of time comprising as its principal ingredients clay, petrolatum, glycerine, lithopone, a pigment, and a solid antiseptic non-volatile at ordinary room temperatures and being present in such amount as to be harmless to the human body externally as well as internally.

LEE W. SEXTON.